US010746887B2

(12) United States Patent
Hornman et al.

(10) Patent No.: US 10,746,887 B2
(45) Date of Patent: Aug. 18, 2020

(54) METHOD OF CALIBRATING DEPTHS OF A SEISMIC RECEIVER ARRAY

(71) Applicant: SHELL OIL COMPANY, Houston, TX (US)

(72) Inventors: Johan Cornelis Hornman, Rijswijk (NL); Albena Alexandrova Mateeva, Houston, TX (US); Paul Maarten Zwartjes, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 414 days.

(21) Appl. No.: 15/737,788

(22) PCT Filed: Jun. 24, 2016

(86) PCT No.: PCT/EP2016/064654
§ 371 (c)(1),
(2) Date: Dec. 19, 2017

(87) PCT Pub. No.: WO2016/207341
PCT Pub. Date: Dec. 29, 2016

(65) Prior Publication Data
US 2019/0004195 A1 Jan. 3, 2019

(30) Foreign Application Priority Data
Jun. 26, 2015 (EP) ..................... 15174021

(51) Int. Cl.
*G01V 1/40* (2006.01)
*G01V 1/16* (2006.01)
(Continued)

(52) U.S. Cl.
CPC ............. *G01V 1/168* (2013.01); *G01V 1/164* (2013.01); *G01V 1/226* (2013.01); *G01V 1/40* (2013.01);
(Continued)

(58) Field of Classification Search
CPC ........ G01V 1/168; G01V 1/164; G01V 1/226; G01V 1/40; G01V 1/362; G01V 2210/6169
See application file for complete search history.

(56) References Cited

U.S. PATENT DOCUMENTS 4,312,040 A * 1/1982 Tinch .................. G01V 11/00
324/323
5,966,672 A 10/1999 Knupp
(Continued)

FOREIGN PATENT DOCUMENTS

WO 2012089818 A1 7/2012

OTHER PUBLICATIONS

Linari, "A practical approach to well-seismic data calibration", The Leading Edge, vol. 23, Issue No. 8, Aug. 1, 2004, pp. 774-775, XP055233888.
(Continued)

*Primary Examiner* — Krystine E Breier (57) ABSTRACT

A seismic receiver array has a plurality of seismic receiver channels, each coupled to a local surrounding in an earth formation. A formation-material-dependent response of each seismic receiver channel is determined, and associated with an assumed depth for the corresponding seismic receiver channel. The formation-material-dependent responses as function of the assumed depth are compared to an independent depth log of at least one petrophysical parameter of the earth formation as a function of depth along the borehole. Based on the comparison, a set of lags between said assumed depth and depth in the independent depth log is determined, that provides the best correlation between the formation-material-dependent response and the independent depth log of the at least one petrophysical parameter of the earth formation. The assumed depth of each seismic receiver
(Continued)

channel can thus be aligned with corresponding depths in the independent depth log.

13 Claims, 4 Drawing Sheets

(51) Int. Cl.
    *G01V 1/22*     (2006.01)
    *G01V 1/36*     (2006.01)

(52) U.S. Cl.
    CPC ...... *G01V 1/362* (2013.01); *G01V 2210/6169* (2013.01)

(56) References Cited

U.S. PATENT DOCUMENTS

| | | | |
|---|---|---|---|
| 2006/0031017 A1* | 2/2006 | Mathieu | G01V 3/20 702/6 |
| 2006/0180349 A1* | 8/2006 | Dashevskiy | G01V 1/40 175/40 |
| 2006/0256657 A1* | 11/2006 | Robinson | G01V 1/40 367/38 |
| 2013/0279841 A1 | 10/2013 | Joinson et al. | |
| 2013/0294720 A1 | 11/2013 | Koelman et al. | |
| 2014/0036628 A1 | 2/2014 | Hill et al. | |
| 2014/0126325 A1* | 5/2014 | Farhadiroushan | G01V 11/00 367/35 |
| 2014/0345388 A1 | 11/2014 | Den Boer et al. | |

OTHER PUBLICATIONS

Mateeva et al., "Distributed acoustic sensing for reservoir monitoring with vertical seismic profiling", Geophysical Prospecting, vol. 62, Issue No. 4, 2014, pp. 679-692, XP055231175.

Taner et al., "Surface consistent corrections", Geophysics, vol. 46, Issue No. 1, 1981, pp. 17-22, XP002670905.

International Search Report and Written Opinion received for PCT Patent Application No. PCT/EP2016/064654, dated Dec. 2, 2016, 11 pages.

* cited by examiner

METHOD OF CALIBRATING DEPTHS OF A SEISMIC RECEIVER ARRAY

CROSS REFERENCE TO RELATED APPLICATIONS

This is a national stage application of International application No. PCT/EP2016/064654, filed 24 Jun. 2016, which claims benefit of priority of European application No. 15174021.4, filed 26 Jun. 2015.

FIELD OF THE INVENTION

The present invention relates to a method of calibrating depths of a plurality of seismic receiver channels in a seismic receiver array disposed in a borehole in an earth formation.

BACKGROUND OF THE INVENTION

Various seismic techniques have been developed which employ a seismic receiver array disposed in a borehole in an earth formation. Examples include tomographic techniques (such as include cross-borehole seismic tomography), and Vertical Seismic Profiling (VSP).

Distributed Acoustic Sensing (DAS) is a useful novel technology to provide such a seismic receiver array in a borehole in an earth formation for seismic data acquisition purposes. A description of this technology is provided in an article "Distributed acoustic sensing for reservoir monitoring with vertical seismic profiling" by Albena Mateeva et al., which appeared in *Geophysical Prospecting*, Vol. 62, pp. 679-692 (2014). Conceptually, DAS measurements are simple. A DAS interrogator unit sends laser pulses along an optical fiber disposed in a wellbore, and measures signals of back-scattered light. The optical fiber can be subdivided into DAS receiver channels (corresponding, for instance, to VSP receiver levels) based on the time of flight of a laser pulse along it. However, pinpointing the exact physical depth of a DAS receiver channel with respect to geology, is not trivial, and requires some calibration of the optical depths versus depths in the borehole.

Similarly, there can be a need for depth calibration of seismic receiver arrays of other types of seismic receiver channels, such as arrays of geophones.

A method for determining the location of a fiber optic channel is described in US 2013/0279841. The location of one or more fiber optic channels in this method is determined by:
a) arranging an electrical conductor and a magnetic source at a known location adjacent to at least one of the channels;
b) transmitting an electrical current through the electrical conductor, thereby deforming the electrical conductor by Lorenz forces in the vicinity of the magnetic source;
c) conveying the deformation of the electrical conductor to deform an adjacent channel;
d) transmitting light pulses through the fiber optic cable and using variations in the light pulses back reflected by the deformed channel and the known location of the magnetic source to determine the location of the deformed channel.

A drawback of this known method for determining the location of a fiber optic channel is that it requires additional equipment in the wellbore in order to locally deform the optical fiber at a known depth in order to be able to use the variations in the light pulses back reflected by the deformed channel and the known depth to determine the depth of the deformed channel relative to an external frame of reference (such as a geology).

SUMMARY OF THE INVENTION

In accordance with a first aspect of the present invention, there is provided a method of calibrating depths of a plurality of seismic receiver channels in a seismic receiver array disposed in a borehole in an earth formation, said method comprising:
  selecting a seismic receiver array disposed in a borehole in an earth formation, wherein said seismic receiver array comprises a plurality of seismic receiver channels, whereby each seismic receiver channel is locally coupled to the earth formation that is present adjacent to the seismic receiver channel;
  attributing an assumed depth to each seismic receiver channel in the plurality of seismic receiver channels;
  determining a formation-material-dependent response of each seismic receiver channel induced by seismic waves propagating through the earth formation adjacent to each respective seismic receiver channel location;
  providing an independent depth log of at least one petrophysical parameter of the earth formation as a function of depth along the borehole;
  for a number of the seismic receiver channels determining a set of lags between said assumed depth and depth in the independent depth log that provides the best correlation between the formation-material-dependent response of the seismic receiver channels and the independent depth log of the at least one petrophysical parameter of the earth formation; and
  outputting a set of corrected depths or correction values for the plurality of seismic receiver channels to align the assumed depth of each seismic receiver channel of the plurality of seismic receiver channels with corresponding depths in the independent depth log.

BRIEF DESCRIPTION OF THE DRAWING

These figures are not to scale. Identical reference numbers used in different figures refer to similar components.

DETAILED DESCRIPTION OF THE INVENTION

The invention will be further illustrated hereinafter by way of example only, and with reference to the non-limiting drawing.

The person skilled in the art will readily understand that, while the invention is illustrated making reference to one or more a specific combinations of features and measures, many of those features and measures are functionally independent from other features and measures such that they can be equally or similarly applied independently in other embodiments or combinations.

In the description and claims, the term "formation-material-dependent response" is a response in the seismic receiver channel that is affected by the elastic properties of the formation material of the earth formation to which the receiver channel is coupled. This is the formation material of the earth formation adjacent to the position of the seismic receiver channel. Suitably, the formation-material-dependent response may be expressed in the form of a channel-consistent amplitude scalar as may be determined using a channel-consistent scalar derivation technique known in the art. A channel-consistent scalar, as understood by those skilled in the art, is a single numerical value which characterizes the response of a specific channel as configured within its local environment coupled to the earth formation, by removing contributions or effects of other circumstances that can effect a factual response, such as differences in seismic source signatures, or differences in locations of the seismic sources, etc. The concept of consistency in seismic detection is well known to those of skill in the art and adequately explained in, for instance, a landmark paper by M T Taner and F Koehler, titled "Surface consistent corrections" published in Geophysics Vol 46 No. 1 (1981) pp. 17-22. Receiver-consistency and/or channel-consistency as introduced in the present description and claims are considered to be physical analogues to surface-consistency, applicable when the receiver channels are disposed in a borehole in the earth formation rather than on the earth surface.

Moreover, in the context of the present disclosure, the term "depth" is generally understood to mean measured depth (MD) unless otherwise specified. MD is a term of art used to denote measured length along the trajectory or path of the borehole. This measurement differs from the true vertical depth (TVD) of the borehole in all but vertical boreholes. However, sometimes it is convenient to convert MD to TVD or vice versa. Such conversion is possible if the trajectory of the borehole is known. Such conversion may be convenient for instance to tie seismic channel depths to a seismic velocity model. It is not essential what point is defined as zero depth. For convenience it is proposed to define the top end of the borehole at the earth's surface as zero depth.

In the broadest sense, the term "a number of" means one or more. In specific embodiments, the term "a number of" may mean a plurality of, or, two or more.

A method of calibrating depths of a plurality of seismic receiver channels in a seismic receiver array disposed in a borehole in an earth formation is proposed herein. The seismic receiver array comprises a plurality of seismic receiver channels, which may form a string of interconnected seismic receiver channels. An assumed depth is attributed to each seismic receiver channel. Each seismic receiver channel is locally coupled to the earth formation that is present adjacent to the seismic receiver channel location. In the context of the present disclosure, adjacent to the seismic receiver channel means the earth formation directly outside the borehole in an exclusively transverse direction from the location of the seismic receiver channel compared to the longitudinal direction of the borehole. A formation-material-dependent response of each seismic receiver channel is determined. Such formation-material-dependent response of each seismic receiver channel is suitably represented by a single numerical value (which may be a scalar), which is preferably a value of signal amplitude, for each seismic receiver channel.

Thus, couples of formation-material-dependent response and the assumed depth will be available for each seismic receiver channel, and this way the formation-material-dependent response may be considered as a function of the assumed depth. The formation-material-dependent response as function of the assumed depth is compared to an independent depth log of at least one petrophysical parameter of the earth formation as a function of depth along the borehole. Based on the comparison, a set of lags between said assumed depth and depth in the independent depth log is determined, that provides the best correlation between the formation-material-dependent response and the independent depth log of the at least one petrophysical parameter of the earth formation.

This way, a set of corrected depth or a set of correction values can be outputted for the plurality of seismic receiver channels, to align the assumed depth of each seismic receiver channel of the plurality of seismic receiver channels with corresponding depths in the independent depth log. By correlating the formation-material-dependent responses of the seismic receiver channels with the independent depth log, in essence the entire receiver array or at least a large portion of the receiver array can aligned with petrophysical formation features, rather than having to rely on interpolation between a few fixed points such as tap test points and end-of-array alignment. Another advantage is that this can be done without the need to install additional equipment in the borehole. Moreover, it can be applied retrospectively on existing seismic data sets that have been acquired using the seismic receiver array.

Furthermore, an advantage of the method is that the assumed depth of each seismic receiver channel of the plurality of seismic receiver channels is aligned with corresponding depths in the independent depth log. This may not be the same as the true depth, but it is for many purposes more important to know the relative location of the seismic receiver channels with respect to geological features in the earth formation.

The method can be applied in time-lapse mode as well, to maximize repeatability between seismic vintages. The method can reveal displacements of seismic receiver channels over time. In case the seismic receiver channels are DAS receiver channels, the method can also be used to guard against potential changes within the DAS optical fiber, such as changes in index of refraction over time, which might occur under the influence of temperature changes. Such temperature changes may occur for instance in the course of enhanced oil recovery (EOR) operations which may, for instance, involve steam injection. The term "DAS optical fiber" relates to any type of optical fiber that is optically coupled to an interrogation unit that is capable of grouping continuous distributed signals into channel signals. The term "DAS cable" relates to one or more DAS optical fibers packaged in a single cable whereby the DAS optical fibers are embedded and/or surrounded by at least one protective material.

The material of the earth formation affects the seismic receiver response to incident seismic waves. As stated above, the term "formation-material-dependent response" is a response in the seismic receiver channel that is affected by the local elastic properties of the material of the earth formation to which the receiver channel is coupled. Seismic waves that propagate through the material by particle motion can be picked up by a motion sensor or a strain sensor such as geophones or DAS optical fibers. The deformation of the material in response to a seismic wave is governed by the elastic tensor of the material and hence the local elastic properties of the material to which the receiver channel is coupled affect the response. Elastic properties of the material also affect the responses to seismic waves that propagate through the material as a pressure wave. This may be understood, as the pressure pulse manifests under a constant particle velocity via the acoustic impedance of the material.

Suitably, the petrophysical parameter of the earth formation of the independent depth log is a parameter that is dependent on an elastic property of the earth formation.

The formation-material-dependent response and the at least one petrophysical parameter of the independent log are preferably both sensitive to the elastic properties of the earth formation surrounding the seismic receiver channels. Examples include a sonic log, a density log, and an acoustic impedance log. An acoustic impedance log can be constructed by combining a sonic log and a density log. In some cases, for instance in certain elastic environments, including sand and shale formations, a gamma ray log may be indicative of acoustic impedance and thus be suitable for this purpose as well.

The method described herein can be employed for any type of seismic receiver array, including arrays of geophones and DAS optical fibers. However, for the sake of conciseness the remainder of the description will be made taking DAS optical fibers as example. Main advantages of DAS optical fibers are that the coverage is usually larger than with geophones and/or the seismic receiver channel spacing can be lower (i.e. a higher number of seismic receiver channels per unit length). Both these factors make it easier to correlate the formation-material-dependent receiver responses to the independent logs. The person skilled in the art will be able to apply the same principles to other types of seismic receiver arrays.

Figure 1:
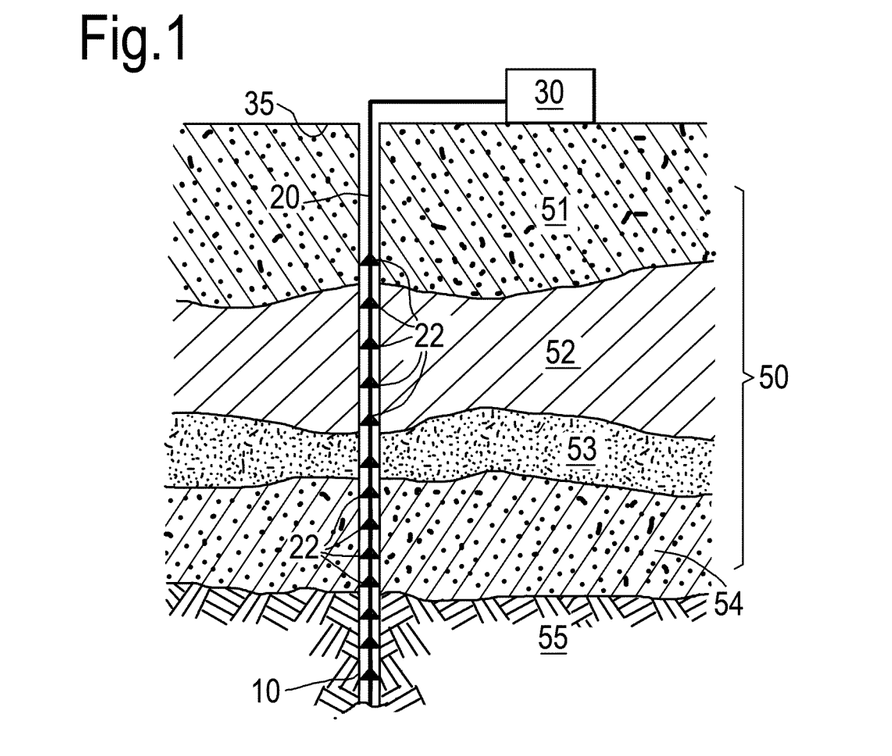
FIG. 1 shows a schematic longitudinal section of a borehole in an earth formation.

Referring now to FIG. 1, there is shown a schematic longitudinal section of a borehole 10 in an earth formation 50. The borehole 10 traverses through a number of geological layers (schematically indicated by areas 51 to 55), each having its own properties, including elastic properties. A DAS optical fiber 20 is disposed in the borehole 10. The (DAS) optical fiber 20 is subdivided in a plurality of DAS receiver channels 22. Only a few of these DAS receiver channels 22 are depicted in FIG. 1 in the interest of visual clarity. In reality, hundreds of DAS receiver channels, with a receiver channel spacing of between 2 m and 10 m, are not uncommon. Each seismic receiver channel 22 is locally coupled to the earth formation 50 that is that is present adjacent to the location of the seismic receiver channel 22 in question. This can be done by cementing the DAS cable behind well casing, for example. For the avoidance of doubt, in the context of the present disclosure a seismic receiver channel is locally coupled to the earth formation that is present adjacent to the location of the seismic receiver channel in question if there a physical path of contact between the location of the seismic receiver channel and said earth formation within a plane that is transverse to the longitudinal direction of the borehole between the seismic receiver channel and the earth formation, either directly or through intermediate materials which could include cement and/or well tubulars such as casing.

An interrogator unit 30 is configured on the earth's surface 35. The interrogator unit 30 is connected to the DAS optical fiber 20 and arranged to transmit optical laser pulses into the DAS optical fiber 20 and detect back scattered optical signals which are influenced by deformations along the optical fiber, which may be caused by impinging seismic waves. Since any part of the optical fiber can be deformed and interrogated for seismic information this type of measurement is called distributed acoustic sensing. The location of any deformation may be determined from the known time of flight of the optical laser pulse that sensed it. Thus, the DAS optical fiber 20 can be subdivided into the DAS receiver channels 22 (corresponding to VSP receiver levels, for instance) based on the time of flight of the optical laser pulse along it.

Figure 2:
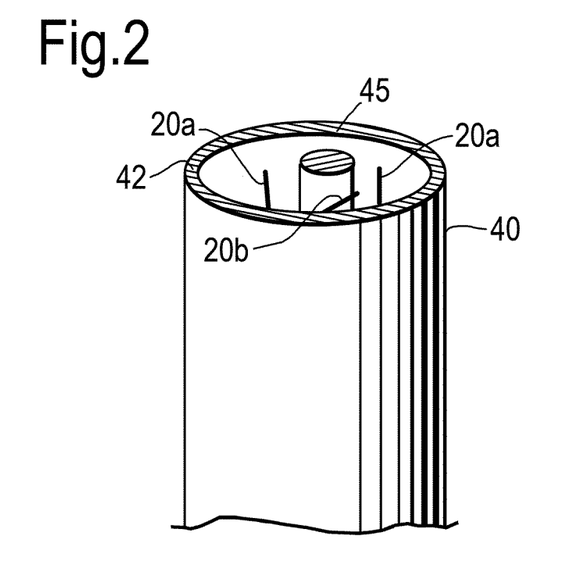
FIG. 2 shows a schematic view of a DAS cable.

Suitably, the DAS optical fiber 20 is packaged in a DAS cable 40. A schematic view of an example is shown in FIG. 2. The DAS cable may comprise a plurality of DAS optical fibers, which when used simultaneously can enhance the signal to noise ratio. Two straight longitudinal optical fibers 20a are shown in FIG. 2 as an example, but more may be provided such as five. Alternatively, or in addition thereto, one or more helically wound optical fibers 20b may be configured in the DAS cable 40. Suitably, these helically wound optical fibers 20b may be wound around a core 45. Everything may be embedded in protective materials, and covered by one or more protective out layers. One protective outer layer 42 is shown as an example. Unlike straight longitudinal optical fibers 20a, cables comprising helically wound optical fibers 20b are sensitive to broadside p-waves (p-waves with a propagation component within a plane extending perpendicular to the longitudinal direction of the cable at the intersection of the cable with the plane).

An assumed depth can be attributed to each seismic receiver channel 22 in the plurality of seismic receiver channels. A common procedure is to determine where the distal end of the DAS optical fiber 20 is located in the borehole, and from there on derive assumed depths of the DAS receiver channels 22 above it. Assumed depths of the DAS receiver channels 22 may also be derived from optical distance (under assumptions about fiber trajectory) as determined from the time of flight of reflected optical pulses. This optical depth does not necessarily coincide with the measured depth along the borehole 10, because there can be causes of deviations such as slack in the optical fiber relative to the borehole 10 or erroneous assumptions about the index of refraction of the DAS optical fiber 20.

Figure 3:
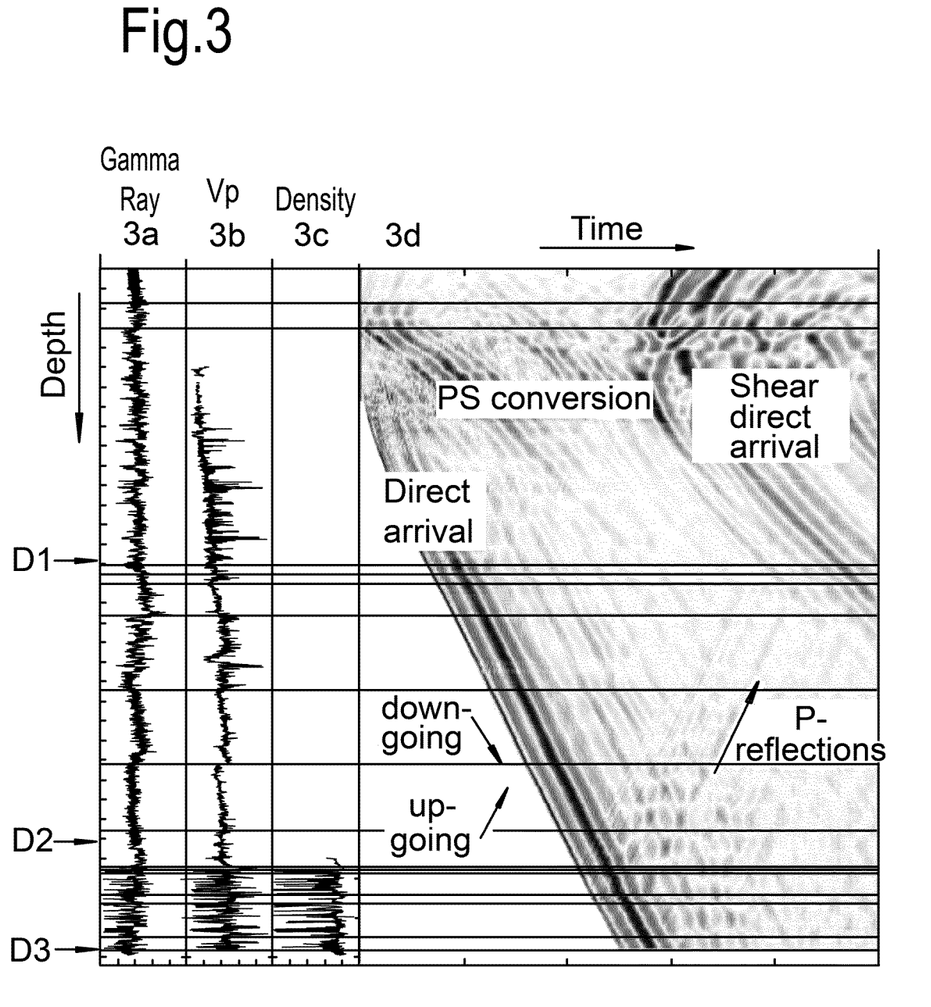
FIG. 3 shows several independent depth logs ($3a$=gamma ray log; $3b$=sonic log; $3c$=density log) and a zero offset VSP ($3d$) measured using a DAS cable.

FIG. 3, part 3d, shows seismic traces of a zero-offset VSP gather acquired by using DAS simultaneously on with five optical fibers deployed in a borehole. The five optical fibers may be configured in a single DAS cable. The response times are plotted on a horizontal and the DAS receiver channels are plotted along a vertical axis, using assumed depths on a TVD scale. Three depth levels (D1, D2, D3) are indicated for reference. The (downgoing) direct arrival can be seen on the left and upgoing waves due to reflections on geological interfaces are visible as well. Notably, a large number of upgoing waves caused by reflections on features below a depth D2 are observed. Embodiments of the present invention allow alignment of the assumed depths to more meaningful geological depths.

To this end independent depth logs, representative of parameters relating to elastic properties of the earth formation 50 as a function of depth along the borehole 10, are provided. FIGS. 3a to 3c show various independent logs plotted on the same depth scale as FIG. 3d and measured in the same borehole. Horizontal scales are linear scales. FIG. 3a is a gamma ray log—the horizontal scale interval ranges from 0.0 to 150 API units (a standard measure of natural gamma radiation measured in a borehole defined by the American Petroleum Institute). FIG. 3b is a sonic velocity log for p-waves—the horizontal scale interval ranges from 2000 to 6000 m/s. FIG. 3c is a density log—the horizontal scale interval ranges from 1.45 to 2.95 g/cm$^3$. The horizontal scales are disclosed for reference purposes only; as will become apparent absolute values are not needed for carrying out embodiments of the invention.

In order to correlate the seismic traces of FIG. 3d with independent logs, channel-consistent scalars (in the present case: DAS channel-consistent scalars) were derived from the DAS VSP data, in a manner analogous to surface-consistent scalar derivation for surface seismic data (reference is made, again, to the paper by Taner and Koehler). The channel-consistent scalars are inversely proportional to the average signal amplitude in each seismic receiver channel.

Suitably, the value of signal amplitude is determined relative to a reference signal amplitude for each seismic receiver channel. Suitably, the value of signal amplitude corresponds to a root-mean-square (RMS) average amplitude of a plurality of coherent seismic events, such as all the signals corresponding to upgoing waves seen in FIG. 3d. Suitably, multiple gathers are considered such as multiple gathers taken with mutually differing source-receiver offsets, to derive the DAS channel-consistent scalar. Walkaway VSP shot gathers are an example of suitable multiple gathers. The so derived channel-consistent scalars constitute a convenient measure of a formation-material-dependent response.

In any such way, a formation-material-dependent response of each seismic receiver channel 22 induced by seismic waves propagating through the earth formation 50 may thus be determined using actual measurements of signals of back-scattered light from the DAS optical fiber 20, and considered as a function of the assumed depth of the seismic receiver channel by which the formation-material-dependent response was determined.

Figure 4:
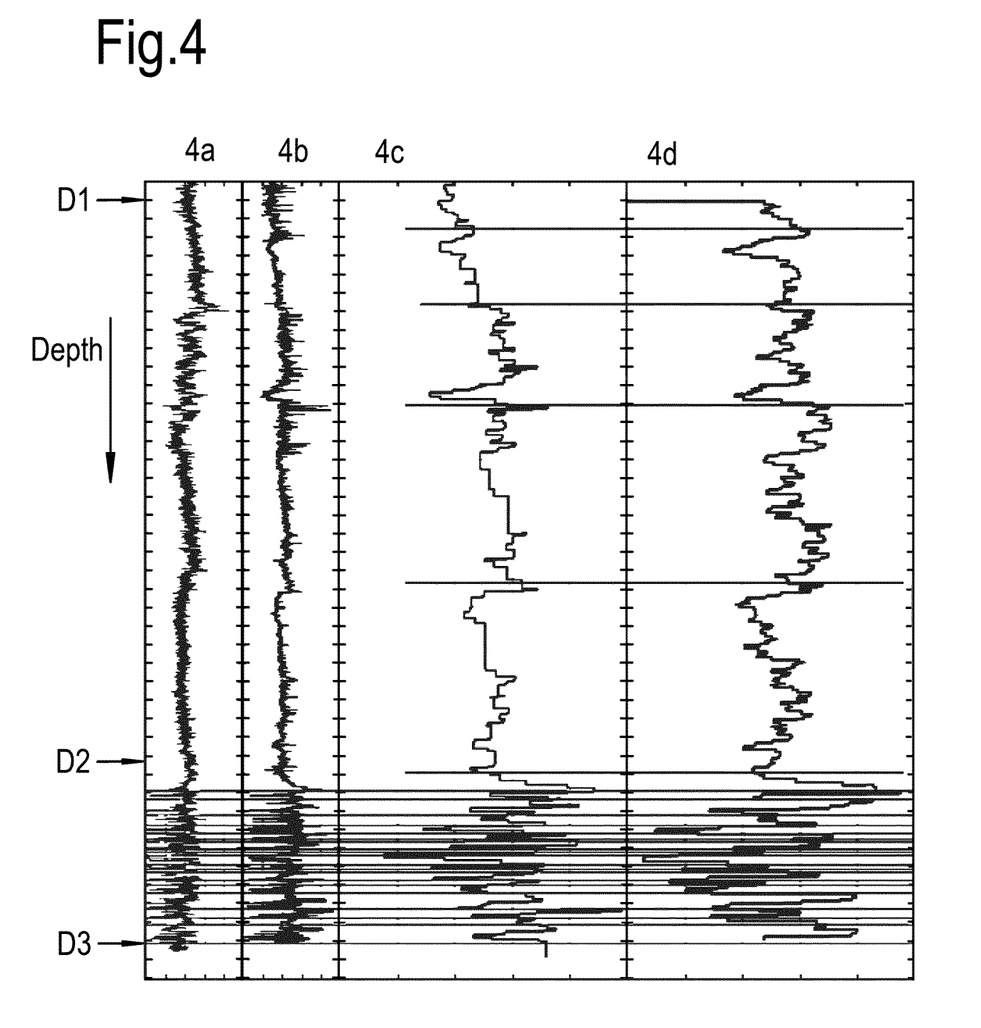
FIG. 4 shows a gamma ray log ($4a$), a sonic log ($4b$), a blocked sonic log ($4c$) and DAS channel-consistent scalars ($4d$) all derived from the data of FIG. 2 between D1 and D3.

A result of this procedure is illustrated in FIG. 4. FIG. 4d in this figure shows a plot of the DAS channel-consistent scalars, derived from seismic traces from a 2D walk-away VSP survey with dynamite sources, on a linear scale against depth. The depths are based on the assumed depths of the DAS receiver channels. (Depth is plotted as MD.) Only data between D1 and D3 are considered. For easy comparison, a segment of the gamma ray log of FIG. 3a is reproduced in FIG. 4a, and a segment of the sonic log of FIG. 3b is reproduced in FIG. 4b.

FIG. 4c corresponds to the sonic log of FIG. 4b after upscaling. Upscaling serves to facilitate comparing the independent log with the receiver-consistent scalars of the DAS receiver channels. This is particularly useful if depth sampling of the independent depth log is finer than the DAS receiver channel sampling (values for the at least one petrophysical parameter of the earth formation in the independent depth log—such as the p-wave velocity—are available for a number of depths per unit length, the number being larger than the number of DAS receiver channels per said unit length). In the presented case, the upscaling has been performed by data blocking, which essentially is to represent blocks of logging values as single data points. Suitably, the upscaled depth log has a single value of the at least one petrophysical parameter of the earth formation per DAS receiver channel.

As can be seen by comparing FIG. 4c with FIG. 4d, a remarkable correlation is found between the DAS channel-consistent scalars of FIG. 4d with the blocked sonic log of FIG. 4c. The correlation can be observed on the basis of the unblocked data of FIG. 4b as well, but the similarity is more strikingly observed in FIG. 4c.

Once a correlation has been established, a set of lags between said assumed depth and depth in the independent depth log can be determined for a number of the seismic receiver channels. This can be done based on matching some discrete pronounced features such as those indicated by connecting lines between FIGS. 4c and 4d, or by maximizing the correlation between the two data sets using computational techniques. One possible computational technique to maximize the correlation is to pick the maximum of the cross-correlation in a sliding window between the two data sets. The ultimate goal is to determine a set of lags that provides the best correlation between the formation-material-dependent response (e.g. the seismic channel-consistent scalars) and the independent depth log of the at least one petrophysical parameter of the earth formation (e.g. the sonic log). A set of correction values may then be established and outputted for the plurality of seismic receiver channels. The set of correction values may then be used to align the assumed depth of each seismic receiver channel of the plurality of seismic receiver channels with corresponding depths in the independent depth log.

There is also a correlation between the gamma ray log of FIG. 4a and the DAS channel-consistent scalars of FIG. 4d, but in the present example this is a much weaker correlation, because the gamma ray log is only indirectly related to the elastic properties of the earth formation. The gamma ray log is often correlated with the acoustic impedance for a given environment of deposition, but that correlation is not always present. Thus sonic logs, density logs, or acoustic impedance logs, which are direct measures of various elastic properties of the earth formation, are typically preferred for this purpose of calibration of depths. Nonetheless, gamma ray logs may also be useful in some situations.

Figure 5:
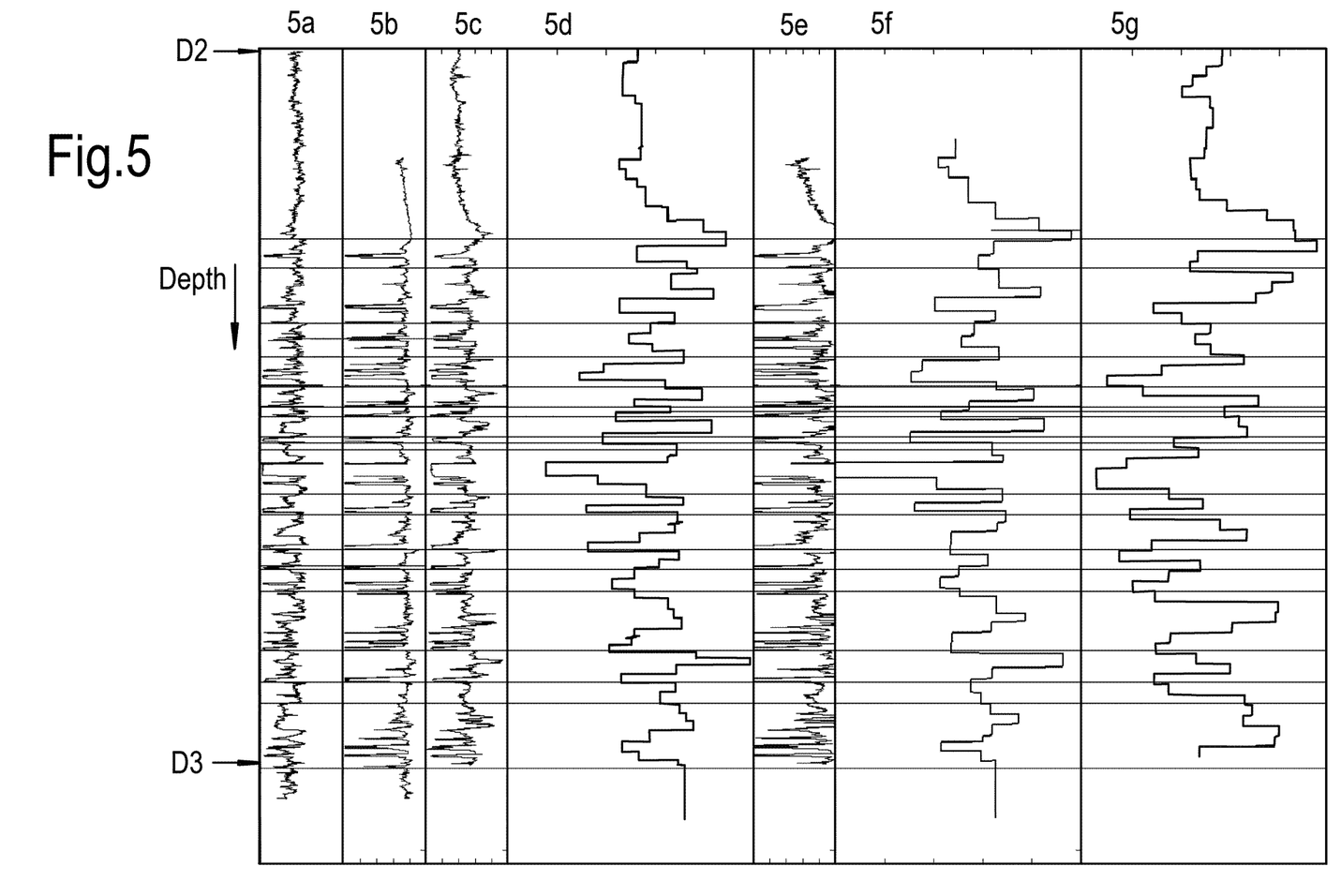
FIG. 5 shows a gamma ray log ($5a$), a density log ($5b$), a sonic log ($5c$), a blocked sonic log ($5d$), an acoustic impedance log ($5e$), a blocked acoustic impedance log ($5f$), and DAS channel-consistent scalars ($5g$) all derived from the data of FIG. 2 between D2 and D3.

As an example, FIG. 5 explores the complex region between depths D2 and D3. As can be seen in FIG. 3c, a density log is available for the majority of this depth range, which allows the acoustic impedance to be derived in this region given that the acoustic impedance is equal to the product of sonic velocity in the medium and density of the medium. The density log is shown in FIG. 5b, and the relevant section of the sonic log is reproduced in FIG. 5c. For general reference the corresponding section of the gamma ray log of FIG. 3a is reproduced in FIG. 5a. FIG. 5d is the blocked sonic log (again, p-wave velocity). FIG. 5e corresponds to the acoustic impedance obtained by multiplying FIGS. 5b and 5c over a depth range where data for both the sonic log as well as the density log is available. FIG. 5f represents the data of FIG. 5e after upscaling using the blocking technique. FIG. 5g shows the DAS channel-consistent scalars. Even in this complex geology at this particular depth range, a remarkable correlation is possible between the DAS channel-consistent scalars of FIG. 5g and sonic log of FIG. 5d as well as the acoustic impedance log of FIG. 5f, based on which the assumed depth of each seismic receiver channel of the plurality of seismic receiver channels can be corrected to match the corresponding depths in the independent depth log.

A computational implementation of the invention may involve correlating the formation-material-dependent response as function of depth with the independent log of the earth parameter as function of depth, and determine the lag for each seismic receiver channel that maximizes the correlation. However, clearly it is not always necessary to compute the lag of all seismic receiver channels with the independent log. Looking at e.g. FIG. 4 it may suffice to determine lags of a selected number of clear corresponding features in the data and then interpolate to generate the output of the correction values based on a much smaller number of determined lags. However, in more complex data sets such as shown in for instance FIG. 5, a larger number of lags may be established to ensure the best correlation is found.

The method explained so far advantageously employs the observed correlation between the formation-material-dependent responses and certain depth logs, particularly sonic depth logs and acoustic impedance depth logs, to calibrate the depth of the seismic receiver channels by aligning the depths to the independent depth logs.

Conversely, the same observed correlation may be employed to create a proxy for an acoustic impedance log or a sonic log in cases where the seismic receiver channel depths are reasonably known and accurate. This can be a powerful addition in cases where no depth logs are available, or only short logs are available. Thus missing lithological information can be inferred from boreholes that do have depth-resolved seismic data.

The converse method can have various useful applications. For instance, low-frequency surface seismic data can be tied to well synthetics based on pseudo-acoustic impedance logs derived from DAS channel factors. This is useful in those cases where the sonic and/or density logs are too short (in a vertical sense) to allow a conventional well-tie for low-frequency surface seismic data. Correspondence can be found between features of the formation-material-dependent responses, particularly responses related to acoustic impedance, in one borehole and independent logs that are available for distant boreholes. This is a new way of tying wells, and is can be useful for constraining dips in the shallow subsurface where logs are often unavailable, or for detecting and/or verifying stratigraphic terminations between adjacent wells.

Another example is found in vertical depth calibration of geological models. Particularly in the case of DAS optical fiber acquisitions, a higher resolution can be obtained than using standard VSP data or than by using the results of seismic inversion based on seismic travel times.

The person skilled in the art will understand that the present invention can be carried out in many various ways without departing from the scope of the appended claims.

The invention claimed is:

1. A method of calibrating depth of a plurality of seismic receiver channels in a seismic receiver array disposed in a borehole in an earth formation, said method comprising:
   selecting a seismic receiver array disposed in a borehole in an earth formation, wherein said seismic receiver array comprises a plurality of seismic receiver channels, whereby each seismic receiver channel is locally coupled to the earth formation that is present adjacent to the seismic receiver channel location;
   attributing an assumed depth to each seismic receiver channel in the plurality of seismic receiver channels;
   determining a formation-material-dependent response of each seismic receiver channel induced by seismic waves propagating through the earth formation adjacent to each respective seismic receiver channel, wherein the formation-material-dependent response of each seismic receiver channel is determined as a value of signal amplitude;
   providing an independent depth log of at least one petrophysical parameter of the earth formation as a function of depth along the borehole;
   for a number of the seismic receiver channels determining a set of lags between said assumed depth and depth in the independent depth log that provides the best correlation between the formation-material-dependent response of the seismic receiver channels and the independent depth log of the at least one petrophysical parameter of the earth formation; and
   outputting a set of corrected depths or correction values for the plurality of seismic receiver channels to align the assumed depth of each seismic receiver channel of the plurality of seismic receiver channels with corresponding depths in the independent depth log.

2. The method of claim 1, wherein the independent depth log comprises values for the at least one petrophysical parameter of the earth formation for a number of depths per unit length that is larger than the number of seismic receiver channels per said unit length, said method comprising upscaling the independent depth to obtain an upscaled depth log that has a single value of the at least one petrophysical parameter of the earth formation per seismic receiver channel.

3. The method of claim 1, wherein at least one petrophysical parameter of the earth formation of the independent depth log is dependent on an elastic property of the earth formation.

4. The method of claim 1, wherein the independent depth log is one of: a sonic log, a density log, and an acoustic impedance log.

5. The method of claim 1, wherein the value of signal amplitude corresponds to an inverse root-mean-square average amplitude of a plurality of seismic events.

6. The method of claim 1, wherein the value of signal amplitude is determined using a channel-consistent scalar technique.

7. The method of claim 1, wherein the seismic receiver channels in the seismic receiver array form a string of seismic receiver channels.

8. The method of claim 1, wherein the seismic receiver array is formed by a Distributed Acoustic Sensing (DAS) system which subdivides an optical fiber in a plurality of DAS receiver channels whereby the seismic receiver channels are said DAS receiver channels.

9. The method of claim 8, wherein said optical fiber is packaged in a cable and operated as a DAS optical fiber.

10. The method of claim 9, wherein a plurality of optical fibers is packaged in said cable, all operated as DAS optical fibers.

11. The method of claim 9, where said optical fiber is helically wound around a core in said cable.

12. The method of claim 9, wherein said formation-material-dependent response of each seismic receiver channel is determined using actual measurements of signals of back-scattered light from the optical fiber.

13. The method of claim 12, wherein said assumed depth corresponds to an optical distance as determined by measuring time-of-flight of the back-scattered light and taking into account a fiber trajectory through the earth formation.

* * * * *